June 6, 1939.  A. OVTSCHINNIKOFF  2,161,082
BOMB SUSPENSION
Filed April 1, 1936
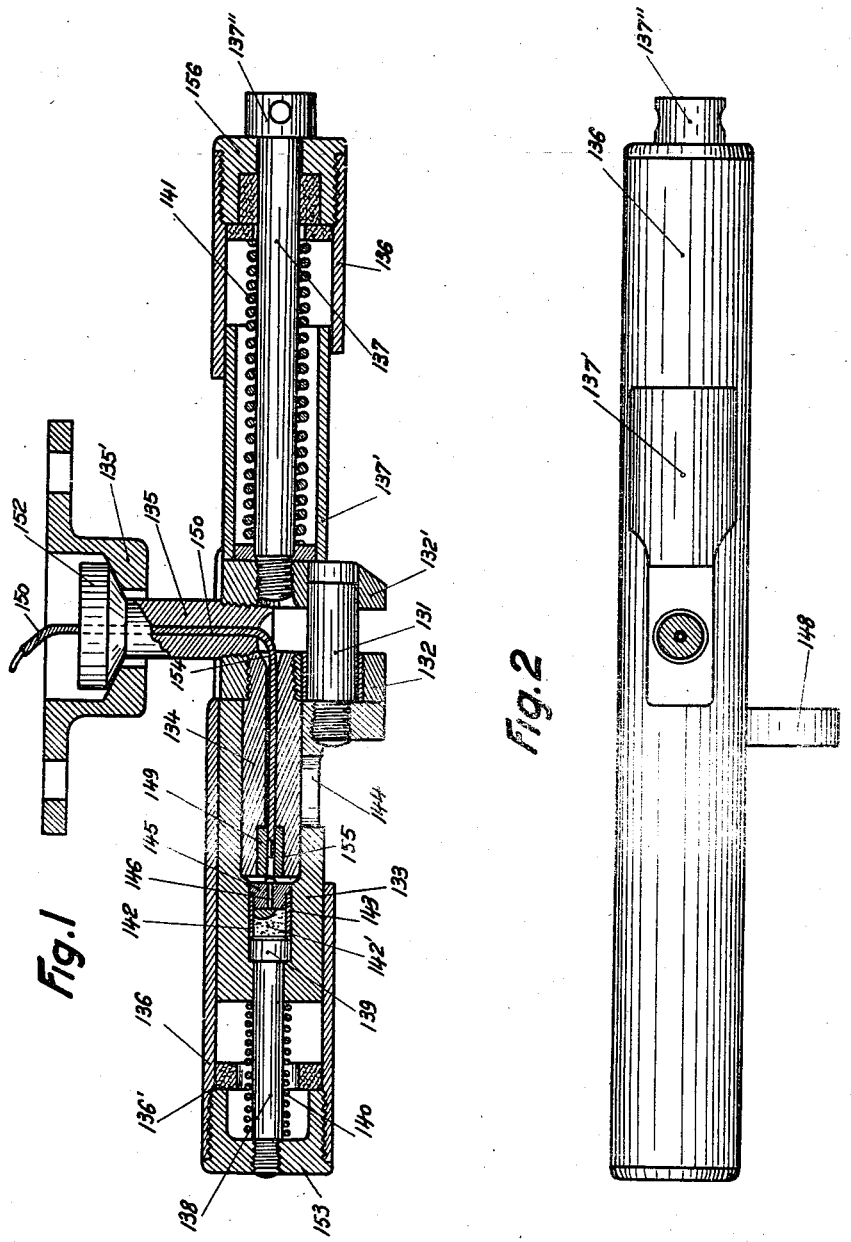
Inventor
Alexandre Ovtschinnikoff
by [signature] Atty.

Patented June 6, 1939

2,161,082

UNITED STATES PATENT OFFICE 2,161,082

BOMB SUSPENSION

Alexandre Ovtschinnikoff, Issy-les-Moulineaux, France

Application April 1, 1936, Serial No. 72,135
In France July 9, 1935

3 Claims. (Cl. 89—1.5)

My invention relates to means for suspending bombs from aircraft and for releasing same, the device being actuated by the explosion of a power charge ignited by an electrical current.

In the drawing affixed to this specification and forming part thereof a device embodying my invention is illustrated diagrammatically by way of example.

In the drawing:

Fig. 1 is a vertical axial section,

Fig. 2 a horizontal section view.

Referring to the drawing, 136 is an apertured metal sleeve suspended from a support 135' fixed to the fuselage of an aircraft or the like and with a ball suspension 152 formed at the top of a connecting piece 135, the sleeve 136 being thus enabled to always retain its horizontal position. 132 and 132' are two eyes fixed to the connecting piece 135 and 131 is a pin supported in the two eyes and serving to have a bomb attached to it, which is then suspended between the eyes 132, 132'. The pin 131 is fixed to a barrel 133 mounted in the left hand half of the sleeve 136 for axial reciprocation against the action of a coil spring 140, the outer end of which rests on the stopper 153 closing this end of the sleeve 136. The spring 140 encircles a piston 138 fixed in the stopper 153 and extending through a bore in the bottom of the barrel 133, the enlarged head 139 of the piston fitting the boring of the barrel and resting against the barrel bottom, when the barrel is acted upon by the pressure of spring 140. This latter embraces another piston 134 fixed in the member forming the eye 132, this piston being formed with an axial conduit 154 and, at its inner end, with a larger bore 155, in which is seated an insulated metallic sleeve 149. Into this sleeve and through the bore 154 of the piston 134 extends the conductor 150 which also passes through an axial bore in the connecting piece 135 and leads to an electrical switching device (not shown) of a suitable kind.

In the bore 142 of barrel 133 is mounted a cartridge containing a powder charge 142' and a spark plug 143, the rear face part of the cartridge being closed by an insulating stopper 145 traversed by a metal pin 146 connected at one end to the igniting device 143, which is in its turn connected to the cartridge case, and at the other end to the conductor 150.

At the right-hand end the sleeve is closed by a stopper 156, which is traversed by a rod 137 fixed in the member forming the eye 132' and the enlarged head 137'' of which rests on the outer face of the stopper 156. A coil spring 141 tends to hold the head 137'' applied against the stopper 156.

On the igniting circuit being closed, the spark formed at 143 will ignite the charge 142 and the explosion gases will drive the head 139 of piston 138 together with the barrel 133, into which this piston extends, to the left, the sleeve 136 being carried along by these parts and being displaced relative to the piston 134 and the eye members 132, 132'. The suspension pin 131 being fixed to the piston 134 is thereby moved to the left, leaving the eye 132' and sliding in the eye 132, whereby the bomb suspended from the pin 131 is released and allowed to drop. When the sleeve 136 has reached the end of its course, wherein the stopper 156 closing its right-hand end meets the outer end of the sleeve 137', the barrel 133 will continue moving towards the left, compressing spring 140, until the barrel abuts against the buffer ring 136'. At this moment an aperture 144 formed in the wall of the barrel 133 is uncovered and allows the powder gases to escape and the cartridge case to be thrown out. The springs 140 and 141 then return the barrel 133 and the sleeve 136 into their initial positions.

In order to introduce a new cartridge, the barrel 133 is shifted towards the left by means of a laterally projecting handle 148 (Fig. 2) and in carrying along the sleeve 136 renders its interior accessible through the aperture 144.

I wish it to be understood that I do not desire to be limited to the exact details of construction shown and described for obvious modifications will occur to a person skilled in the art.

I claim:

1. A bomb release device for an aircraft which comprises, in combination, a piston adapted to be fixed rigidly to said aircraft, a barrel fitting on said piston movably with respect thereto, a sleeve surrounding said barrel slidably with respect thereto, a part rigid with said piston forming a housing for the suspension ring of a bomb, a supporting pin for said ring rigid with said barrel and slidable in said housing, said barrel being provided with a chamber opposite the end of said piston adapted to receive a load of powder, igniting means for said load operative from the outside of said barrel, a rod rigid with said sleeve having a head fitting in said chamber so as to close one end thereof opposite said piston end, an abutment carried by said head adapted to cooperate with said barrel for driving it outwardly when said load is ignited, at least one spring interposed between the corresponding ends of said barrel and said sleeve, an abutment carried by said piston for stopping the movement of said sleeve with respect to said piston after a predetermined displacement, whereby said barrel is subsequently caused to move alone against the action of said spring with respect to said sleeve, and an abutment for said barrel carried by said sleeve for stopping the movement of said barrel with respect to said sleeve.

2. A bomb release device for an aircraft which comprises, in combination, a piston adapted to be secured to said aircraft, a barrel fitting on said piston movably with respect thereto, a sleeve surrounding said barrel slidably with respect thereto, a part rigid with said piston forming a housing for the suspension ring of a bomb, a supporting pin for said ring rigid with said barrel and slidable in said housing, said barrel being provided with a chamber opposite the end of said piston adapted to receive a load of powder, igniting means for said load operative from the outside of said sleeve, a rod rigid with said sleeve having a head fitting in said chamber so as to close one end thereof opposite said piston end, an abutment carried by said head adapted to cooperate with said barrel for driving it outwardly when said load is ignited, whereby both said sleeve and said barrel are caused to slide with respect to said piston by the explosion of said load, spring means interposed between said sleeve and said piston for resiliently opposing this displacement, an abutment carried by said piston for stopping the movement of said sleeve with respect to said piston after a predetermined displacement, whereby said barrel is subsequently caused to slide alone with respect to said sleeve, spring means interposed between said barrel and said sleeve for resiliently opposing this last mentioned displacement, and an abutment for said barrel carried by said sleeve for stopping the movement of said barrel with respect to said sleeve.

3. A bomb release device for an aircraft which comprises, in combination, a piston adapted to be secured to said aircraft, a barrel fitting on said piston movably with respect thereto, a sleeve surrounding said barrel slidably with respect thereto, a part rigid with said piston forming a housing for the suspension ring of a bomb, a supporting pin for said ring rigid with said barrel and slidable in said housing, said barrel being provided with a chamber opposite the end of said piston adapted to receive a load of powder, igniting means for said load operative from the outside of said sleeve, a rod rigid with said sleeve having a head fitting in said chamber so as to close the end thereof located opposite said piston end, an abutment carried by said head adapted to cooperate with said barrel for driving it outwardly when said load is ignited, whereby both said sleeve and said barrel are caused to slide with respect to said piston by the explosion of said load, spring means interposed between said sleeve and said piston for resiliently opposing this displacement, an abutment carried by said piston for stopping the movement of said sleeve with respect to said piston after a predetermined displacement, whereby said barrel is subsequently caused to slide alone with respect to said sleeve, spring means interposed between said barrel and said sleeve for resiliently opposing this last mentioned displacement, and an abutment for said barrel carried by said sleeve for stopping the movement of said barrel with respect to said sleeve, said barrel being provided with an exhaust port for the explosion gases normally closed by said piston and arranged to be uncovered at the end of the stroke of said barrel.

ALEXANDRE OVTSCHINNIKOFF.